US010958138B2

United States Patent
Kaneko et al.

(10) Patent No.: US 10,958,138 B2
(45) Date of Patent: Mar. 23, 2021

(54) MOTOR

(71) Applicant: Nidec Corporation, Kyoto (JP)

(72) Inventors: Takuya Kaneko, Kyoto (JP); Takahiro Uetani, Kyoto (JP); Noriyuki Iio, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/472,255

(22) PCT Filed: Jan. 16, 2018

(86) PCT No.: PCT/JP2018/001078
§ 371 (c)(1),
(2) Date: Jun. 21, 2019

(87) PCT Pub. No.: WO2018/147012
PCT Pub. Date: Aug. 16, 2018

(65) Prior Publication Data
US 2019/0326799 A1    Oct. 24, 2019

(30) Foreign Application Priority Data
Feb. 7, 2017   (JP) .............................. JP2017-020060

(51) Int. Cl.
*H02K 11/00*   (2016.01)
*H02K 5/15*    (2006.01)
(Continued)

(52) U.S. Cl.
CPC ........... *H02K 11/0141* (2020.08); *H02K 5/15* (2013.01); *H02K 5/161* (2013.01); *H02K 7/083* (2013.01);
(Continued)

(58) Field of Classification Search
CPC ... H02K 11/21; H02K 11/215; H02K 5/00–26
(Continued)

(56) References Cited

U.S. PATENT DOCUMENTS

2006/0226719 A1*  10/2006  Nakanishi ............. H02K 29/12
                                                            310/68 B
2009/0284105 A1   11/2009  Miyashita et al.
2014/0070672 A1    3/2014  Gale

FOREIGN PATENT DOCUMENTS

| JP | 2008-160909 A | 7/2008 | |
| WO | 2008/035755 A1 | 3/2008 | |
| WO | WO-2008035755 A1 * | 3/2008 | ............. H02K 29/12 |

OTHER PUBLICATIONS

Machine Translation, Okubo, WO-2008035755-A1, Mar. 2008. (Year: 2008).*

(Continued)

*Primary Examiner* — Thomas Truong
(74) *Attorney, Agent, or Firm* — Keating & Bennett

(57) ABSTRACT

A motor includes a shaft that extends in an axial direction, a rotor including a field magnet, a stator, a resolver positioned farther toward one side of the motor in the axial direction than the rotor and the stator, and a shield including at least a portion is between the rotor and the resolver in the axial direction. The shield includes a bottom portion of which at least a portion is between the rotor and the resolver in the axial direction and which includes a through-hole through which the shaft passes, and a convex portion that extends from the bottom portion toward the other side in the axial direction. A front end portion of the convex portion is positioned farther toward an inner side of the motor in a radial direction than an outer circumferential portion of the field magnet when viewed in the axial direction.

8 Claims, 8 Drawing Sheets

(51) Int. Cl.
| | |
|---|---|
| *H02K 5/16* | (2006.01) |
| *H02K 11/01* | (2016.01) |
| *H02K 11/215* | (2016.01) |
| *H02K 7/08* | (2006.01) |
| *H02K 11/22* | (2016.01) |
| *H02K 24/00* | (2006.01) |
| *H02K 29/03* | (2006.01) |

(52) U.S. Cl.
CPC ......... *H02K 11/022* (2013.01); *H02K 11/215* (2016.01); *H02K 24/00* (2013.01); *H02K 29/03* (2013.01); *H02K 2213/09* (2013.01)

(58) Field of Classification Search
USPC .......................................... 310/68 B, 89, 90
See application file for complete search history.

(56) References Cited

OTHER PUBLICATIONS

Official Communication issued in International Patent Application No. PCT/JP2018/001078, dated Mar. 20, 2018.

\* cited by examiner

MOTOR

CROSS REFERENCE TO RELATED APPLICATIONS

This application is a U.S. national stage of PCT Application No. PCT/JP2018/001078, filed on Jan. 16, 2018, and priority under 35 U.S.C. § 119(a) and 35 U.S.C. § 365(b) is claimed from Japanese Application No. 2017-020060, filed Feb. 7, 2017, the entire disclosures of each application are incorporated herein by reference.

1. FIELD OF THE INVENTION

The present disclosure relates to a motor.

2. BACKGROUND

Conventionally, the motor has a magnetic sensor such as a resolver or the like to detect a rotational position of a rotor. Generally, a magnetic sensor such as a resolver or the like detects a rotational position of a rotor using magnetism. Therefore, when a magnetic flux generated in a rotor and a stator flows into a magnetic sensor, detection accuracy of the magnetic sensor is lowered.

On the other hand, a configuration is known in which a shielding member for shielding a magnetic flux flowing into a magnetic sensor is disposed between a stator and a magnetic sensor. For example, a brushless motor has a resolver holder as a shielding member for shielding a magnetic flux flowing into a resolver (a magnetic sensor).

However, the bottom wall portion of the resolver holder described above has the through-hole through which the rotor shaft passes. Therefore, in the above-described configuration, there is a possibility of a magnetic flux (a leakage magnetic flux), which is generated in a field magnet of the rotor positioned on an inner side of the stator, flowing in a radial direction from the through-hole into the resolver (the magnetic sensor). That is, the above-described configuration, there is a possibility that the magnetic flux flowing from the rotor into the magnetic sensor cannot be sufficiently suppressed.

On the other hand, it is considered that the resolver holder is arranged at a predetermined distance from the rotor in an axial direction of the rotor such that the magnetic flux does not flow from the rotor into the magnetic sensor. However, in this case, since an axial dimension of the motor becomes large, the motor becomes large.

SUMMARY

One example embodiment of the present disclosure provides a motor including a shaft that extends in an axial direction, a rotor that is rotatable together with the shaft and includes a field magnet, a stator disposed to face the rotor in a radial direction, a magnetic sensor positioned farther toward one side of the motor in the axial direction than the rotor and the stator, and a shield of which at least a portion is positioned between the rotor and the magnetic sensor in the axial direction. The shield includes a bottom portion, of which at least a portion is positioned between the rotor and the magnetic sensor in the axial direction and including a through-hole through which the shaft passes, and a convex portion that extends from the bottom portion toward the other side in the axial direction. A front end portion of the convex portion is positioned farther toward an inner side of the motor in the radial direction than an outer circumferential portion of the field magnet when viewed in the axial direction.

The above and other elements, features, steps, characteristics and advantages of the present disclosure will become more apparent from the following detailed description of the example embodiments with reference to the attached drawings.

DETAILED DESCRIPTION

Figure 1:
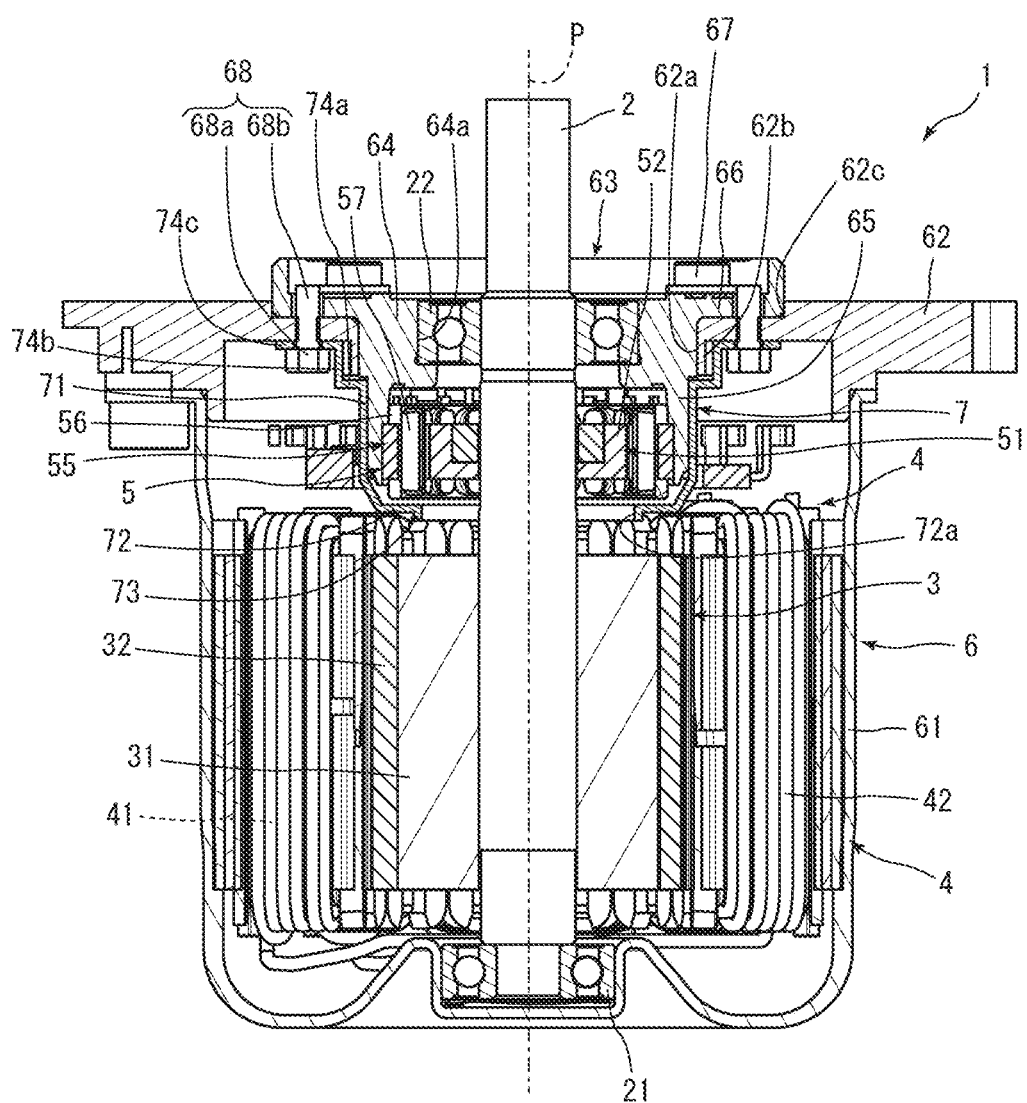
FIG. 1 is a cross-sectional view showing a schematic configuration of a motor according to a first example embodiment of the present disclosure.

Hereinafter, example embodiments of the present disclosure will be described in detail with reference to the accompanying drawings. Further, the same or corresponding portions in the drawings are denoted by the same reference numerals and descriptions thereof will not be repeated. Further, dimensions of configuration members in each drawing do not faithfully represent actual dimensions of the configuration members and dimensional ratios of the respective configuration members.

Further, in the following description, a direction parallel to a central axis of a rotor is referred to as an "axial direction," a direction orthogonal to the central axis is referred to as a "radial direction," and a direction along a circular arc which is about the central axis is referred to as a "circumferential direction." However, the definition of these directions is not intended to limit the directions of the rotor and the motor according to the present disclosure when in use.

Further, in the following description, in the motor, a resolver side (an upper side of FIG. 1) in an axial direction is referred to as "one side in the axial direction," and a rotor side (a lower side of FIG. 1) in the axial direction is referred to as "the other side in the axial direction."

Further, in the following description, the expression "fixation," "connection," or "attachment" (hereinafter referred to as "fixation") includes not only direct fixation of members but also fixation through another member. That is, in the following description, the expression "fixation" includes direct and indirect fixation of members.

FIG. 1 shows a schematic configuration of a motor 1 according to a first example embodiment of the present disclosure. The motor 1 includes a shaft 2, a rotor 3, a stator 4, a resolver (magnetic sensor or rotation angle sensor) 5, a casing 6, and a shield member 7. In the motor 1, the rotor 3 rotates about a central axis (axial line) P with respect to the stator 4. In the present example embodiment, the motor 1 is a so-called inner rotor-type motor in which a rotor 3 is disposed in a cylindrical stator 4 so as to be rotatable about a central axis P. Further, the motor 1 may be a so-called outer rotor-type motor in which a cylindrical rotor is disposed on an outer side of a columnar stator in a radial direction so as to be rotatable about a central axis.

The rotor 3 includes a rotor core 31 and a field magnet 32.

The rotor core 31 has a cylindrical shape extending along the central axis P. The rotor core 31 is formed by stacking a plurality of electrical sheet, which are formed in a predetermined shape, in a thickness direction thereof. The shaft 2 extending along the central axis P passes through the rotor core 31 in the axial direction. Accordingly, the rotor 3 rotates together with the shaft 2. Further, a plurality of field magnets 32 are disposed at predetermined intervals in a circumferential direction thereof on an outer circumferential surface of the rotor core 31. Further, the field magnets 32 may be ring magnets connected in the circumferential direction.

The field magnet 32 is a substantially semi-cylindrical magnet having a length from one axial end of the rotor core 31 to the other axial end. That is, the field magnet 32 has a length equal to a length of the rotor core 31 in the axial direction. Although not particularly shown, in the radial direction of the rotor 3, an outer side surface of the field magnet 32 has N-pole or S-pole magnetism. The field magnet 32 having an N-pole magnetism in the outer side surface and the field magnet 32 having an S-pole magnetism in the outer side surface are alternately disposed in a circumferential direction of the rotor core 31.

The stator 4 is disposed to face the rotor 3 in the radial direction. That is, the rotor 3 is disposed on an inner side of the stator 4 so as to be rotatable about the central axis P. The stator 4 includes a stator core 41 and a stator coil 42. The stator core 41 has a cylindrical shape extending along the axial direction. The stator core 41 is formed by stacking a plurality of electrical sheet, which are formed in a predetermined shape, in a thickness direction thereof. Although not particularly shown, the stator core 41 has a plurality of teeth extending toward an inner side thereof in the radial direction. The stator coil 42 is wound around teeth of the stator core 41.

Further, in the present example embodiment, a length of the stator core 41 in the axial direction is greater than a length of the field magnet 32 of the rotor 3 in the axial direction. Accordingly, torque ripple generated in the motor 1 may be reduced.

The resolver 5 is a rotation detecting sensor which detects rotation of the shaft 2, that is, rotation of the rotor 3, using magnetism. The resolver 5 is disposed on one side of the rotor 3 in the axial direction. The resolver 5 has a resolver rotor (sensor rotor) 51 which rotates together with the shaft 2, and a cylindrical resolver stator (sensor stator) 55.

The resolver rotor 51 has a cylindrical shape extending along the central axis P. The resolver rotor 51 is formed by stacking a plurality of electrical sheet, which are formed in a predetermined shape, in a thickness direction thereof. The shaft 2 extending along the central axis P is fixed to the resolver rotor 51 in a state of passing through in the axial direction. That is, the resolver rotor 51 is fixed to one side of the rotor 3 in the axial direction on an outer circumferential surface of the shaft 2. Accordingly, the resolver rotor 51 is rotatable together with the shaft 2.

Although not particularly shown, the resolver rotor 51 has a plurality of salient pole portions protruding in the radial direction at predetermined intervals in the circumferential direction in a cross section orthogonal to the axial direction.

The resolver stator 55 is disposed to face the resolver rotor 51 in the radial direction. That is, the resolver rotor 51 is disposed on an inner side of the cylindrical resolver stator 55 so as to be rotatable about the central axis P.

The resolver stator 55 has a resolver stator core 56 and a resolver stator coil 57. The resolver stator coil 57 is wound around the resolver stator core 56. Further, an outer diameter of the resolver stator 55 is smaller than an outer diameter of the rotor 3. Therefore, when viewed in the axial direction, the resolver 5 has a size overlapping with the rotor 3.

In the resolver 5, by applying a predetermined voltage to the resolver stator coil 57, a magnetic field is generated in the resolver stator core 56 around which the resolver stator coil 57 is wound. As described above, since the resolver rotor 51 has the plurality of salient pole portions, a distance between the plurality of salient pole portions and the resolver stator core 56 is changed as the resolver rotor 51 rotates together with the shaft 2. Accordingly, the magnetic field generated between the resolver rotor 51 and the resolver stator core 56 is changed. The resolver 5 detects a rotational position of the shaft 2 using a magnetic variation generated between the resolver rotor 51 and the resolver stator core 56 when the resolver rotor 51 rotates together with the shaft 2.

The casing 6 is a cylindrical member in which the shaft 2, the rotor 3, the stator 4, and the resolver 5 are accommodated. In one side of the casing 6 in the axial direction, the shaft 2 passes through the casing 6 and protrudes toward an outer side of the casing 6. The casing 6 has a cylindrical housing 61 having a bottom portion extending in the axial direction, a plate-shaped flange 62, and a bearing holder 63.

A side surface of the housing 61 has an inner diameter sufficient to accommodate the rotor 3 and the stator 4. A bearing 21 which rotatably supports the other side of the shaft 2 in the axial direction is disposed on the bottom portion of the housing 61.

The flange 62 is a plate-shaped member which covers an opening of the housing 61. In particular although not shown, the flange 62 is fixed to the housing 61 by being connected to an attachment portion provided in the opening of the housing 61 by bolts or the like.

The flange 62 has an insertion hole 62a at a central portion thereof when viewed in plan. The bearing holder 63 is disposed in the insertion hole 62a. The bearing holder 63 is connected to the flange 62 by a position adjusting bolt 67.

Figure 3:
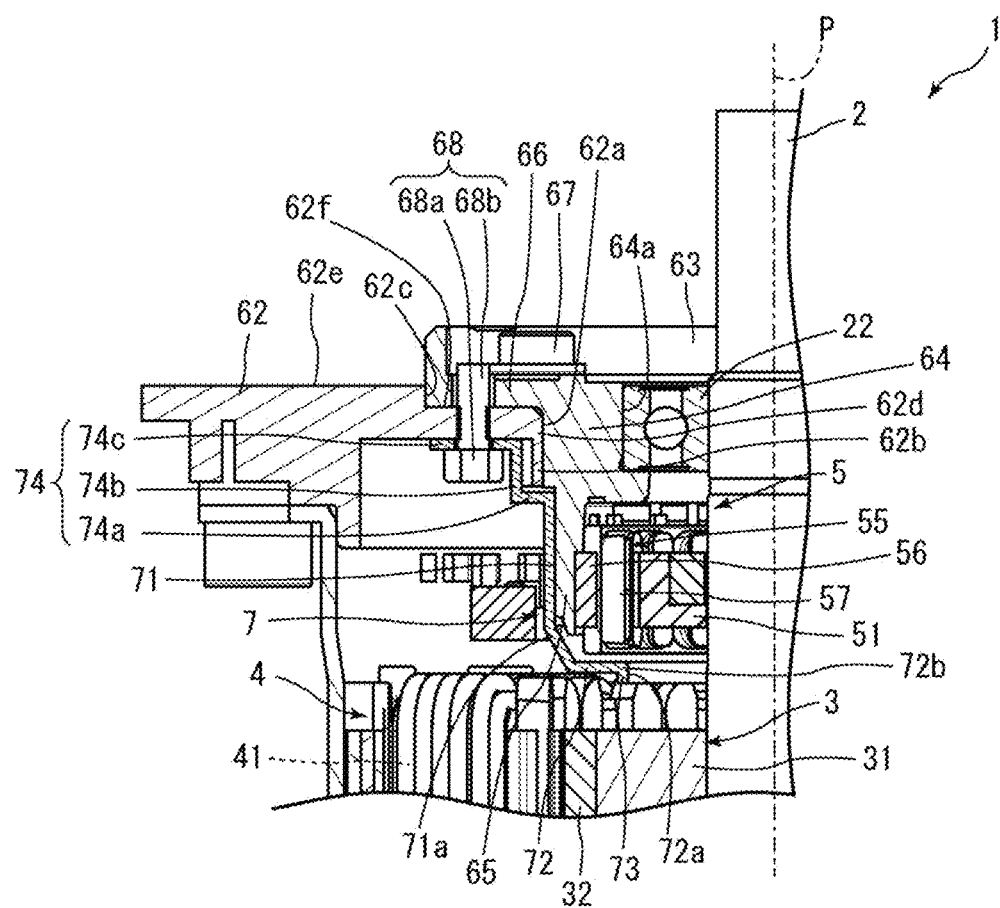
FIG. 3 is an enlarged cross-sectional view showing a peripheral configuration of a shield member in the motor.

Further, as shown in an enlarged view in FIG. 3, the flange 62 has a cylindrical flange protrusion 62b extending toward the other side in the axial direction in a peripheral edge portion 62d facing the insertion hole 62a. An outer circumferential surface of the bearing holder 63 is in contact with an inner circumferential surface of the flange protrusion 62b. A protrusion 74a of the shield member 7, which will be described below, is disposed on an outer side of the flange protrusion 62b in the radial direction. Accordingly, the position of the shield member 7 with respect to the flange 62 and the bearing holder 63, that is, the casing 6, may be determined. Therefore, a convex portion 73 of the shield member 7, which will be described below, may be disposed between the rotor 3 and the resolver 5 so as to have high accuracy.

Further, the peripheral edge portion 62d is a portion facing the insertion hole 62a in the flange 62 and is a portion surrounding the insertion hole 62a when viewed in the axial direction.

In the flange 62, a concave portion 62c is formed on the outer side surface of the casing 6 so as to surround the insertion hole 62a when viewed in the axial direction. That is, the flange 62 has a first surface 62e positioned on one side of the casing 6 in the axial direction, and a second surface 62f, which is positioned farther toward the other side than the first surface 62e in the axial direction and forms a bottom surface of the concave portion 62c. A holder protrusion 66 of the bearing holder 63, which will be described below, is disposed in the concave portion 62c.

A fixing bolt 68 for fixing the shield member 7, which will be described below, passes through the second surface 62f of the flange 62. The shield member 7 is fixed to an inner side of the casing 6 at the flange 62. A head portion 68a of the fixing bolt 68 is positioned on the inner side of the casing 6. A shaft portion 68b of the fixing bolt 68 extends from the head portion 68a positioned on the inner side of the casing 6 toward the outer side of the casing 6. That is, the shield member 7 is fixed to the flange 62 from the inner side of the casing 6 by the fixing bolt 68. Further, a screw hole fastened with the shaft portion 68b of the fixing bolt 68 is formed in a portion of the flange 62 in which the concave portion 62c is provided.

The bearing holder 63 covers the insertion hole 62a of the flange 62 and holds the bearing 22 and the resolver stator 55. The bearing 22 rotatably supports one side of the shaft 2 in the axial direction.

Specifically, the bearing holder 63 has a bearing support portion 64, a holder extending portion 65, and a holder protrusion 66. The bearing support portion 64, the holder extending portion 65, and the holder protrusion 66 are integrally formed.

The bearing support portion 64 has a cylindrical shape having a hole portion 64a in which the bearing 22 is accommodated at a central portion thereof when viewed in plan. The shaft 2 which is rotatably supported by the bearing 22 is inserted into the hole portion 64a and passes therethrough. A portion of the bearing support portion 64 is positioned in the insertion hole 62a of the flange 62. Therefore, a portion of an outer circumferential surface of the bearing support portion 64 is in contact with the inner circumferential surface of the flange protrusion 62b of the flange 62. Accordingly, the bearing holder 63 may be disposed in the radial direction with high accuracy with respect to the flange 62. In addition, as described above, since the flange protrusion 62b of the flange 62 extends toward the other side in the axial direction, an end portion on the other side of the bearing holder 63 in the axial direction may be suppressed from being displaced in the radial direction.

The holder extending portion 65 has a cylindrical shape extending from the bearing support portion 64 toward the other side (the rotor side) in the axial direction. The resolver stator is fixed on an inner circumferential surface of the holder extending portion 65. Accordingly, the resolver stator 55 is positioned between the bearing 22 and the rotor 3 in the axial direction. An outer circumferential surface of the holder extending portion 65 is in contact with an inner circumferential surface of a cylindrical shield member 7 to be described below.

Accordingly, the shield member 7 may be disposed in the radial direction with high accuracy with respect to the holder extending portion 65. In addition, since the bearing holder 63 holds the bearing 22, a degree of coaxiality with the shaft 2 is high. As described above, by arranging the shield member 7 with respect to the holder extending portion 65, the shield member 7 may be disposed based on the holder extending portion 65 having a high degree of coaxiality with the shaft 2. Accordingly, it is possible to suppress the displacement of the mounting position of the shield member 7 in the radial direction with respect to the shaft 2. Therefore, the shield member 7 may be disposed in the radial direction with high accuracy with respect to the rotor 3 and the resolver rotor 51.

The holder protrusion 66 protrudes from an end portion on one side of the bearing support portion 64 in the axial direction toward an outer side in the radial direction. The holder protrusion 66 is disposed on one side in the axial direction with respect to the flange 62. Accordingly, the bearing holder 63 may be disposed in the axial direction with high accuracy with respect to the flange 62.

Figure 2:
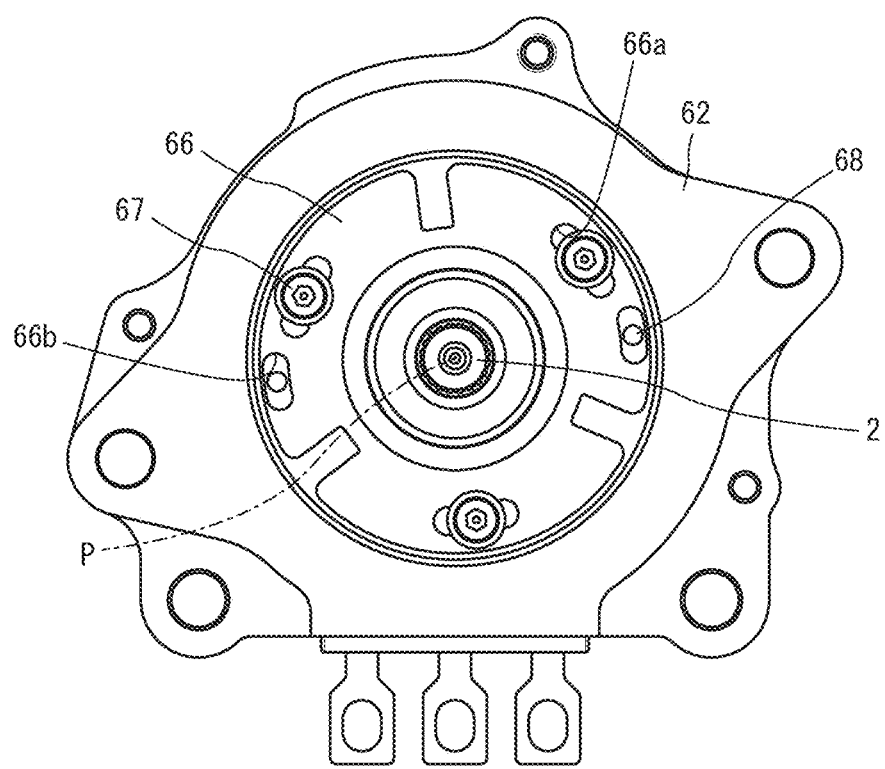
FIG. 2 is a view of the motor when viewed from one side in an axial direction.

FIG. 2 is a view of the motor 1 when viewed from one side in the axial direction. As shown in FIG. 2, the holder protrusion 66 has a long hole 66a for bolt adjusting, into which the position adjusting bolt 67 is inserted and passes through. The long hole 66a for bolt adjusting extends along the circumferential direction about the central axis P when viewed in the axial direction. A plurality of long holes 66a for bolt adjusting are formed in the holder protrusion 66 according to the number of the position adjusting bolts 67.

Further, the holder protrusion 66 has a long hole 66b for bolt fixing, into which the shaft portion 68b of the fixing bolt 68 is inserted and passes through. The long hole 66b for bolt fixing extends along the circumferential direction about the central axis P when viewed in the axial direction. A plurality of long holes 66b for bolt fixing are formed in the holder protrusion 66 according to the number of the fixing bolts 68.

As described above, by providing the long hole 66a for bolt adjusting and the long hole 66b for bolt fixing in the holder protrusion 66, the bearing holder 63 may be fixed to the flange 62 while adjusting a position of the bearing holder 63 in the circumferential direction with respect to the flange 62. Accordingly, the position of the resolver stator 55 fixed to the bearing holder 63 in the circumferential direction may be adjusted with respect to the resolver rotor 51 fixed to the shaft 2. Therefore, even when a dimensional error or the like occurs in the resolver 5, the positions of the resolver rotor 51 and the resolver stator 55 may be easily adjusted.

Figure 4:
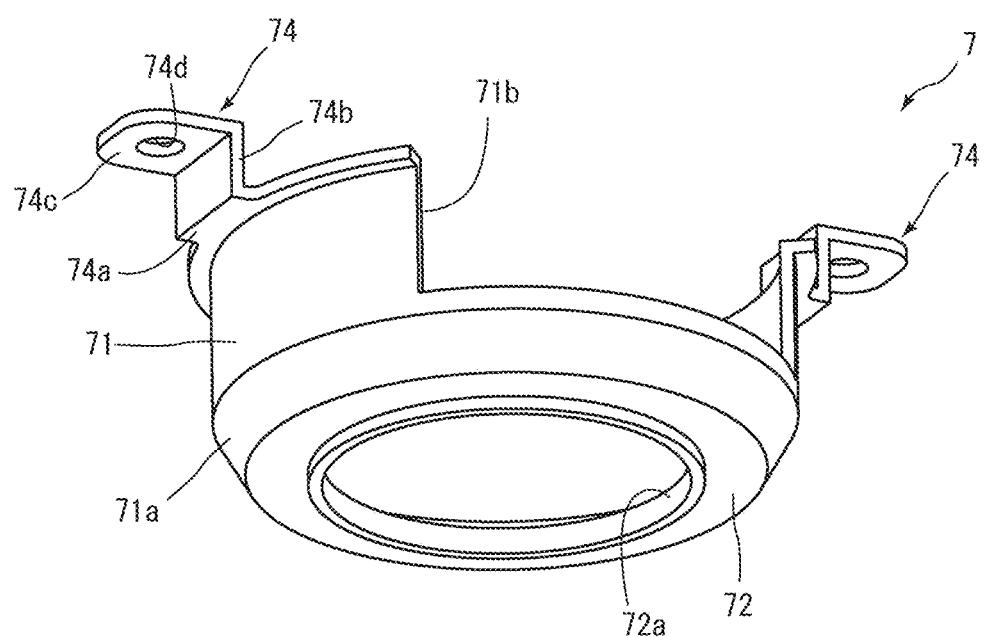
FIG. 4 is a perspective view showing a configuration of the shield.

Next, the configuration of the shield member 7 will be described below with reference to FIGS. 3 and 4. FIG. 3 is an enlarged cross-sectional view showing a peripheral configuration of the shield member 7. FIG. 4 is a perspective view showing the configuration of the shield member 7.

The shield member 7 is a cylindrical member having a bottom made of a magnetic material of a metal such as iron or the like. The shield member 7 covers the other side of the holder extending portion 65 of the bearing holder 63 in the axial direction. As described above, the resolver 5 is accommodated in the holder extending portion 65. Accordingly, the shield member 7 is positioned between the resolver 5 and the rotor 3.

As described above, by arranging the shield member 7 made of the magnetic material between the resolver 5 and the rotor 3, a magnetic flux (a leakage magnetic flux) generated in the rotor and the stator 4 may be absorbed by the shield member 7. Therefore, the shield member 7 suppresses a magnetic flux generated in the rotor 3 and the stator 4 from flowing into the resolver 5.

The shield member 7 has a cylindrical portion 71, a tapered portion 71a, a bottom portion 72, a convex portion 73, and a fixing portion 74. The cylindrical portion 71, the tapered portion 71a, the bottom portion 72, the convex portion 73, and the fixing portion 74 are integrally formed.

The cylindrical portion 71 has a cylindrical shape extending along the axial direction. An inner circumferential surface of the cylindrical portion 71 is in contact with the outer circumferential surface of the holder extending portion 65 of the bearing holder 63. Accordingly, the shield member 7 may be disposed in the radial direction with high accuracy with respect to the bearing holder 63.

The tapered portion 71a is positioned at an end portion on the other side of the cylindrical portion 71 in the axial direction and has a tapered shape having an outer diameter becoming smaller toward a front end thereof. The tapered portion 71a is positioned between the cylindrical portion 71 and the bottom portion 72. Further, the cylindrical portion 71 and the bottom portion 72 may be connected to each other without being provided with the tapered portion 71a.

As described above, in the present example embodiment, a length of the stator core 41 in the axial direction is greater than a length of the field magnet 32 of the rotor 3 in the axial direction. In addition, in the present example embodiment, an outer diameter of the cylindrical portion 71 of the shield member 7 is greater than an inner diameter of the stator 4, and the bottom portion 72 of the shield member 7 is positioned farther toward the other side in the axial direction than an end portion on one side of the stator coil 42 in the axial direction.

On the other hand, as described above, since the shield member 7 has the tapered portion 71a between the cylindrical portion 71 and the bottom portion 72, it is possible to prevent the shield member 7 from being brought into contact with the stator 4. Therefore, the shield member 7 may be disposed in the motor 1, in which torque ripple generated in the motor 1 can be reduced, without interfering with the stator 4.

Further, an opening 71b into which a wiring (not shown) or the like is inserted and passes through is provided in the cylindrical portion 71 (see FIG. 4). The wiring or the like electrically connects the resolver 5 or the like to a control device (not shown) outside the motor 1.

As shown in FIGS. 3 and 4, the fixing portion 74 is provided at an end portion on one side of the cylindrical portion 71 in the axial direction. The fixing portion 74 protrudes outward in the radial direction and toward one side in the axial direction. A pair of fixing portions 74 are provided at each opposite side of the cylindrical portion 71 with the central axis P interposed therebetween when the shield member 7 is viewed in the axial direction. The fixing portion 74 has a first protrusion 74a, a second protrusion 74b, and an attachment portion 74c. The first protrusion 74a protrudes from the end portion on one side of the cylindrical portion 71 in the axial direction toward the outer side in the radial direction. The second protrusion 74b extends from an outer end of the first protrusion 74a in the radial direction toward one side of in the axial direction and is positioned farther toward the outer side in the radial direction than the flange protrusion 62b. Accordingly, the position of the shield member 7 in the circumferential direction may be determined based on the flange 62.

The attachment portion 74c is positioned at an end portion on one side of the second protrusion 74b in the axial direction and protrudes from the end portion on one side toward the outer side in the radial direction. A front end portion of the attachment portion 74c, which is positioned on the outer side in the radial direction when viewed in the axial direction, has a semicircular shape. The attachment portion 74c has an attachment hole 74d. The shield member 7 may be fixed to the flange 62 by fastening the fixing bolt 68 to the attachment hole 74d and a screw hole of the flange 62.

The bottom portion 72 has a circular shape when viewed in the axial direction. Further, the bottom portion 72 covers at least a portion of an end portion of the resolver 5 in the axial direction when viewed from the other side in the axial direction. That is, the bottom portion 72 is positioned between the resolver stator 55 and the rotor 3. Accordingly, the magnetic flux generated in the rotor 3 and the stator 4 may be suppressed from flowing into the resolver 5.

The bottom portion 72 has a through-hole 72a at a central portion thereof when viewed in plan. The shaft 2 is inserted into the through-hole 72a and passes therethrough. A hole diameter of the through-hole 72a is greater than an outer diameter of the resolver rotor 51. That is, the hole diameter of the through-hole 72a is sufficient for the resolver rotor 51 to pass through. Accordingly, the shaft 2 and the resolver rotor 51 may pass through the through-hole 72a in a state in which the resolver rotor 51 is fixed to the shaft 2. Therefore, when the motor 1 is assembled, in a state in which the shield member 7 is fixed to the flange 62 and the resolver stator 55 is fixed to the bearing holder 63, the resolver rotor 51 fixed on the shaft 2 may be disposed in the resolver stator 55 by being inserted into the through-hole 72a and passing therethrough.

When the through-hole 72a described above is provided in the bottom portion 72, a gap into which the resolver rotor 51 can be inserted and pass through is formed between a peripheral edge portion 72b facing the through-hole 72a and the outer circumferential surface of the shaft 2. That is, the hole diameter of the through-hole 72a of the shield member 7 is greater than the outer diameter of the resolver rotor 51. There is a possibility of a magnetic flux, which is generated in the field magnet 32 of the rotor 3, flowing into the resolver 5 from the gap.

On the other hand, in the present example embodiment, the shield member 7 has the convex portion 73 positioned on the peripheral edge portion 72b facing the through-hole 72a of the bottom portion 72 and extending toward the other side in the axial direction. Accordingly, the magnetic flux generated in the field magnet 32 of the rotor 3 may be absorbed by the convex portion 73. Therefore, the magnetic flux generated in the field magnet 32 of the rotor 3 may be suppressed from flowing into the resolver 5 through the through-hole 72a of the bottom portion 72.

The convex portion 73 has an annular shape which extends in a direction orthogonal to the bottom portion 72 and surrounds the through-hole 72a, in a cross section orthogonal to the axial direction. Accordingly, the magnetic flux generated in the field magnet 32 of the rotor 3 may be further suppressed from flowing into the through-hole 72a.

Further, in the present example embodiment, a front end portion of the convex portion 73 is positioned farther toward an inner side in the radial direction of the rotor 3 than an outermost portion (outer circumferential portion) of the field magnet 32 in the radial direction when viewed in the axial direction. Accordingly, since the magnetic flux generated in the field magnet 32 is absorbed by the convex portion 73, the magnetic flux may be suppressed from flowing into the through-hole 72a of the bottom portion 72.

Further, the front end portion of the convex portion 73 may be positioned farther toward the inner side in the radial direction of the rotor 3 than an innermost portion (inner circumferential portion) of the field magnet 32 in the radial direction when viewed in the axial direction. Accordingly, the magnetic flux generated in the field magnet 32 may be further suppressed from flowing into the through-hole 72a of the bottom portion 72.

The convex portion 73 has a substantially rectangular shape in a cross section including the central axis P. In addition, in the axial direction, a protruding length of the convex portion 73 is equal to a plate thickness of the shield member 7.

The motor 1 according to the present example embodiment includes the shaft 2 extending in the axial direction, the rotor 3 which is rotatable together with the shaft 2 and has the field magnet 32, the stator 4 arranged to face the rotor 3 in the radial direction, the resolver 5 positioned farther toward one side in the axial direction than the rotor 3 and the stator 4, and the shield member 7 of which at least a portion is positioned between the rotor 3 and the resolver 5 in the axial direction. The shield member 7 has the bottom portion 72 of which at least a portion is positioned between the rotor 3 and the resolver 5 in the axial direction and which has the through-hole 72a through which the shaft 2 passes and the convex portion 73 which extends from the bottom portion 72 toward the other side in the axial direction. The front end portion of the convex portion 73 is positioned farther toward the inner side in the radial direction than the outer circumferential portion of the field magnet 32 when viewed in the axial direction.

With the above-described configuration, the magnetic flux may be suppressed from flowing into the resolver 5 from the field magnet 32 provided in the rotor 3.

Specifically, the convex portion 73, which extends from the bottom portion 72 to the other side in the axial direction and is positioned farther toward the inner side in the radial direction of the rotor 3 than the outer circumferential portion of the field magnet 32 when viewed in the axial direction, is formed on the bottom portion 72 of the shield member 7. Accordingly, the magnetic flux in the field magnet 32 is absorbed into the convex portion 73 of the shield member 5. Therefore, the magnetic flux in the field magnet 32 may be suppressed from flowing into the resolver 5.

Therefore, even when the distance between the field magnet 32 and the resolver 5 is reduced in the axial direction of the shaft 2, the magnetic flux may be suppressed from flowing into the resolver 5 from the field magnet 32. Therefore, an influence of the magnetic flux in the field magnet 32 on the detection accuracy of the resolver 5 may be reduced, and the size of the motor 1 in the axial direction may be prevented from being increased.

The front end portion of the convex portion 73 may be positioned farther toward the inner side in the radial direction of the rotor 3 than an inner circumferential portion of the field magnet 32 when viewed in the axial direction. Accordingly, the magnetic flux may be further suppressed from flowing into the resolver 5 from the field magnet 32 of the rotor 3 due to the convex portion 73 provided in the bottom portion 72 of the shield member 7. That is, with the above-described configuration, the magnetic flux in the field magnet 32 is further absorbed by the convex portion 73. Accordingly, the magnetic flux may be suppressed from flowing into the through-hole 72a provided in the bottom portion 72 of the shield member 7 from the field magnet 32.

In the above-described configuration, the convex portion 73 is positioned in a portion of the peripheral edge portion 72b facing the through-hole 72a in the bottom portion 72 of the shield member 7 and extends toward the other side in the axial direction. Accordingly, the magnetic flux may be suppressed from flowing into the through-hole 72a provided in the bottom portion 72 of the shield member 7 from the field magnet 32 of the rotor 3. Therefore, the magnetic flux may be suppressed from flowing into the resolver 5 from the field magnet 32.

In the above-described configuration, the convex portion 73 has a shape which surrounds the through-hole 72a in a cross section orthogonal to the axial direction. Accordingly, the magnetic flux may be suppressed from flowing into the through-hole 72a provided in the bottom portion 72 of the shield member 7 from the field magnet 32 of the rotor 3.

In the above-described configuration, the rotor 3 is positioned on the inner side in the radial direction of the stator 4. The resolver 5 has the resolver rotor 51 and the resolver stator 55. The resolver rotor 51 is positioned on the inner side in the radial direction of the resolver stator 55. The rotor 3 and the resolver rotor 51 are fixed to an outer side of the shaft 2 in the radial direction so as to be rotatable together with the shaft 2. The hole diameter of the through-hole 72a of the shield member 7 is greater than the outer diameter of the resolver rotor 51.

As described above, in the configuration in which the rotor 3 and the resolver rotor 51 are fixed on the outer circumferential surface of the shaft 2, it is necessary to make the hole diameter of the through-hole 72a of the shield member 7, which is positioned between the rotor 3 and the resolver 5, large so that the resolver rotor 51 can pass through when the motor 1 is assembled. However, when the through-hole 72a of the shield member 7 is large, the magnetic flux in the field magnet 32 may easily pass through the through-hole 72a. Therefore, the magnetic flux may easily flow into the resolver 5 from the field magnet 32.

On the other hand, as in the above-described configuration, by providing the convex portion 73 in the bottom portion 72 of the shield member 7, the magnetic flux may be suppressed from flowing into the through-hole 72a of the shield member 7 from the field magnet 32. Therefore, the through-hole 72a of the shield member 7 may be increased without degrading detection accuracy of the resolver 5 so that assembly workability of the motor 1 may be improved.

In the above-described configuration, the motor 1 further includes the cylindrical housing 61 in which at least the rotor 3 and the stator 4 are accommodated and which has a bottom with an opening, the plate-shaped flange 62 fixed to the housing 61 and having the insertion hole 62a into which the shaft 2 is inserted and passes through, and the bearing 22 which rotatably supports the shaft 2, and the bearing holder 63 of which at least a portion is positioned in the insertion hole 62a of the flange 62 and having a hole portion 64a in which the bearing 22 is accommodated. The resolver stator 55 is fixed to the bearing holder 63. The bearing holder 63 is fixed to the flange 62 so as to be positionally adjustable in the circumferential direction of the shaft 2 about the central axis P.

Specifically, the bearing holder 63 has the bearing support portion 64 having the hole portion 64a and of which a portion is positioned in the insertion hole 62a of the flange 62, the cylindrical holder extending portion 65 extending from the bearing support portion 64 to the other side in the axial direction, and the holder protrusion 66 protruding from the bearing support portion 64 toward the outside in the radial direction and positioned on one side in the axial direction with respect to the flange 62. The resolver stator 55 is fixed on the inner circumferential surface in the holder extending portion 65. The holder protrusion 66 is fixed to the flange 62 so as to be positionally adjustable in the circumferential direction of the shaft 2 about the central axis P.

The resolver 5 uses the resolver rotor 51 and the resolver 55 to detect a rotation angle of the rotor 3. Therefore, it is necessary to align the resolver rotor 51 and the resolver stator 55 with high accuracy so that the rotation angle of the rotor 3 can be detected with high accuracy.

On the other hand, the positions of the resolver rotor and the resolver stator 55 may be aligned even when a dimensional error or the like occurs due to the above-described configuration. Therefore, with above-described configuration, the detection accuracy of the resolver 5 provided in the motor 1 may be improved.

In the above-described configuration, the shield member 7 is fixed to the flange 62 or the bearing holder 63. Accordingly, the shield member 7 may be fixed to the casing 6. Therefore, the bottom portion 72 of the shield member 7 may be disposed between the rotor 3 and the resolver 5 with high accuracy.

In the above-described configuration, the shield member 7 has the cylindrical portion 71 extending from the bottom portion 72 to one side in the axial direction and covering a portion of the bearing holder 63 and the fixing portion 74 provided in the cylindrical portion 71. The fixing portion 74 is fixed to the flange 62 or the bearing holder 63.

Accordingly, the shield member 7 may be fixed to the flange 62 or the bearing holder 63. In addition, due to the cylindrical portion 71 of the shield member 7, the magnetic flux generated in the stator 4 may be suppressed from flowing into the resolver 5. Therefore, it is possible to suppress the magnetic flux from flowing into the resolver 5 from the rotor 3 and the stator 4 and to suppress the detection accuracy of the resolver 5 from being reduced.

In the above-described configuration, the flange 62 has the flange protrusion 62b extending to the other side in the axial direction in the edge portion 62d facing the insertion hole 62a. The fixing portion 74 has the first protrusion 74a protruding toward the outer side in the radial direction from the end portion on one side of the cylindrical portion 71 in the axial direction, the second protrusion 74b extending from the outer end of the first protrusion 74a in the radial direction toward one side of in the axial direction, and the attachment portion 74c positioned at the end portion on one side of the second protrusion 74b in the axial direction and fixed to the flange 62. The second protrusion 74b is positioned farther toward the outer side in the radial direction than the flange protrusion 62b.

Accordingly, the position of the second protrusion 74b of the shield member 7 may be determined with respect to the flange protrusion 62b of the flange 62. Therefore, the position of the shield member 7 may be determined with respect to the flange 62. Accordingly, since the shield member 7 may be positioned at a predetermined position with respect to the resolver 5, the magnetic flux may be further suppressed from flowing into the resolver 5 from the field magnet 32 of the rotor 3 due to the shield member 7.

Figure 5:
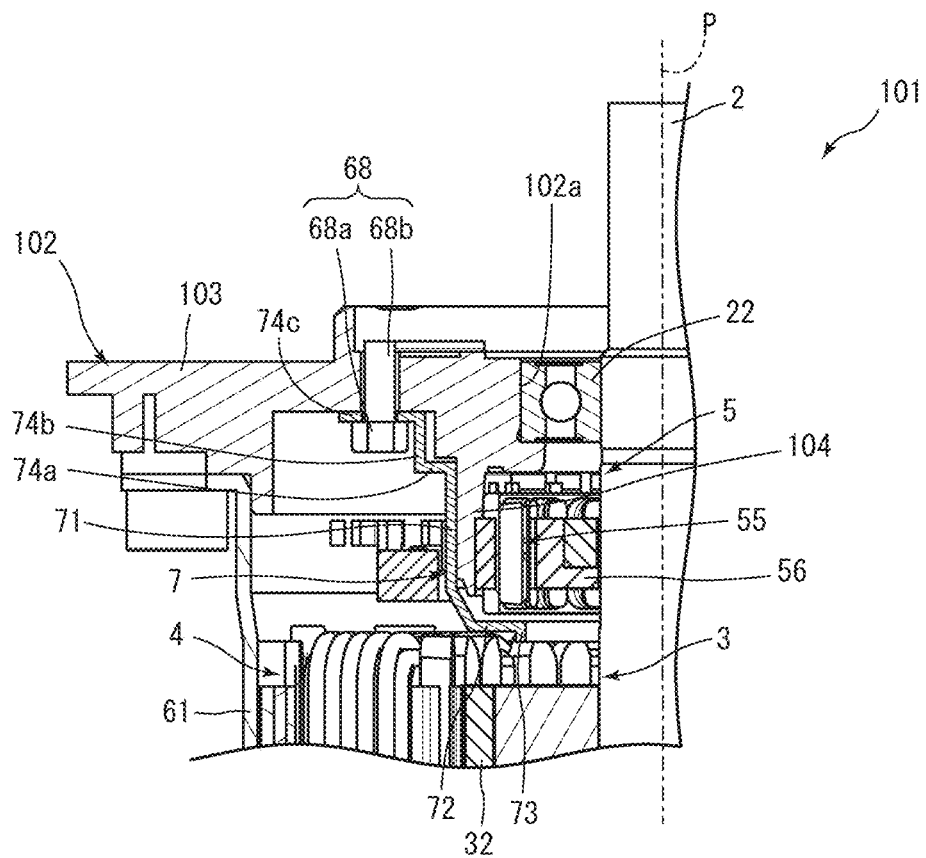
FIG. 5 is a view of a motor according to a second example embodiment of the present disclosure corresponding to FIG. 3.

FIG. 5 shows a cross-sectional view of a motor 101 according to a second example embodiment. The motor 101 according to the second example embodiment differs from the motor 1 according to the first example embodiment in a configuration of a member that covers an opening of a housing 61. Hereinafter, the same configurations as those in the first example embodiment will be denoted by the same reference numerals, descriptions thereof will be omitted, and only the differences from the first example embodiment will be described.

As shown in FIG. 5, the motor 101 has a lid portion 102 which covers the opening of the housing 61. The lid portion 102 is fixed to the opening of the housing 61 by bolts (not shown) or the like. The lid portion 102 is a disk-shaped member and has a hole portion 102a in which a bearing 22 is accommodated in a central portion thereof when viewed in plan.

The lid portion 102 has a plate portion 103 having the hole portion 102a at a central portion thereof when viewed in plan and a cylindrical extending portion 104 extending from the plate portion 103 toward the other side in the axial direction. The plate portion 103 is fixed to the opening of the housing 61. An attachment portion 74c of a shield member 7 is fixed to the plate portion 103 by a fixing bolt 68. A resolver stator 55 is fixed to an inner circumferential surface of the extending portion 104. That is, a resolver 5 is disposed on an inner side of the extending portion 104.

The shield member 7 covers the extending portion 104 in which the resolver 5 is disposed on an inner side thereof, from the other side in the axial direction. The attachment portion 74c of the shield member 7 is fixed to the housing 61 of the lid portion 102 by the fixing bolt 68. Further, the fixing bolt 68 is also fastened to the shield member 7 and the lid portion 102 from an inner side of a casing in the same manner as in the first example embodiment.

The lid portion 102 of the present example embodiment is a member in which the flange 62 and the bearing holder 63 in the first example embodiment are integrated. Therefore, the number of parts may be reduced as compared to the configuration of the first example embodiment so that assembly workability of the motor 101 may be improved.

Although the example embodiments of the present disclosure have been described above, the above-described example embodiments are only an illustration for implementing the present disclosure. Therefore, the present disclosure is not limited to the above-described example embodiments, and the example embodiment described above may be appropriately modified and implemented without departing from the scope of the disclosure.

In each of the example embodiments, a motor 1 has a resolver 5. However, the motor 1 may have a magnetic sensor other than the resolver. That is, a shield member 7 having a convex portion 73 as described in each of the example embodiments may be disposed between a rotor and the magnetic sensor. Examples of the magnetic sensor may include a Hall-effect sensor and a magnetoresistive (MR) sensor.

In each of the example embodiments, the convex portion 73 has an annular shape in a cross section orthogonal to an axial direction. However, the convex portion 73 may have any shape as long as the convex portion 73 has the shape in which the cross section can surround a through-hole 72a other than the annular shape. Further, the convex portion 73 may not have a shape that surrounds the through-hole 72a and may be provided only on a portion of a peripheral edge portion 72b facing the through-hole 72a.

In each of the example embodiments, the convex portion 73 is formed in the peripheral edge portion 72b facing the through-hole 72a at a bottom portion 72 of the shield member 7. However, the convex portion 73 may be formed at any position as long as a magnetic flux generated in a field magnet 32 of a rotor 3 can be absorbed at the bottom portion 72 other than a position of the peripheral edge portion 72b facing the through-hole 72a. For example, the convex portion 73 may be formed at a position between an outer circumferential portion and the through-hole 72a of the bottom portion 72 of the shield member 7.

In each of the example embodiments, the convex portion 73 extends in a direction orthogonal to the bottom portion 72. Further, the convex portion 73 may extend to be inclined as long as the convex portion 73 extends toward the other side in the axial direction with respect to the bottom portion 72.

In each of the example embodiments, the attachment portion 74c of the shield member 7 is fixed to a flange 62 by a fixing bolt 68. However, the attachment portion 74c may be fixed to the flange 62 by a fixing method other than the fixing bolt 68. For example, the attachment portion 74c may be fixed to the flange 62 by a method using an adhesive, heat welding, caulking, or the like. Further, the attachment portion 74c may be directly attached to the flange 62 or may be attached to the flange 62 through another member. That is, the shield member 7 may be directly or indirectly fixed to the flange 62. Further, the shield member 7 may be fixed to a bearing holder 63 instead of the flange 62.

Figure 6:
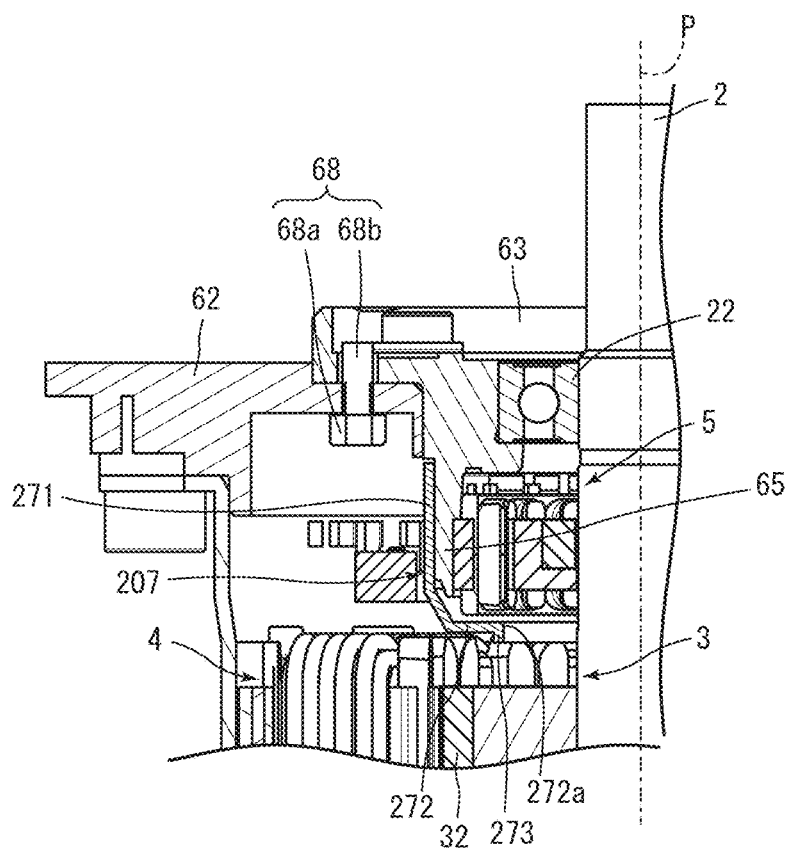
FIG. 6 is a view of a motor according to another example embodiment of the present disclosure corresponding to FIG. 3.

In each of the example embodiments, the shield member 7 has a cylindrical portion 71, a bottom portion 72, a convex portion 73, and a fixing portion 74. However, the shield member may not have the fixing portion. In this case, as shown in FIG. 6, a cylindrical portion 271 may be fixed to an outer circumferential surface of a holder extending portion 65 of the bearing holder 63. In FIG. 6, the configuration of the motor is identical to that of the first example embodiment except that a shield member 207 does not have a fixing portion. Further, in FIG. 6, reference numeral 272 denotes a bottom portion, reference numeral 273 denotes a convex portion, and reference numeral 272a denotes a through-hole.

Figure 7:
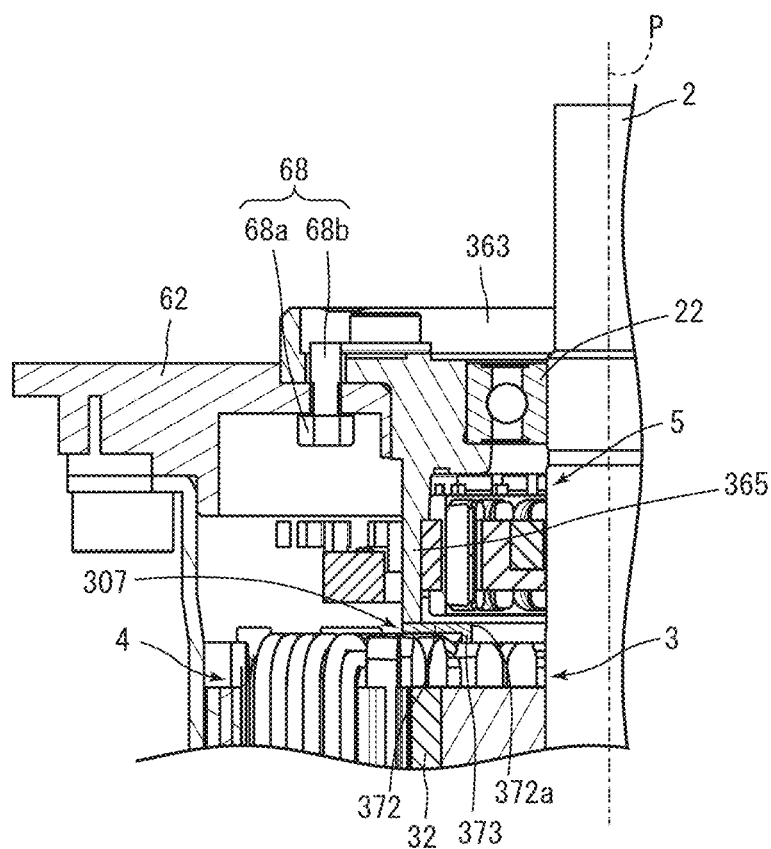
FIG. 7 is a view of a motor according to still another example embodiment of the present disclosure corresponding to FIG. 3.

Further, the shield member may not have a cylindrical portion and a fixing portion. In this case, as shown in FIG. 7, a holder extending portion 365 of a bearing holder 363 may be provided to cover a resolver 5, and a bottom portion 372 may be fixed to an end portion on the other side of the holder extending portion 365 in the axial direction. In FIG. 7, the configuration of the motor is identical to that of the first example embodiment except that a shield member 307 does not have a cylindrical portion and a fixing portion and the configuration of the holder extending portion 365. Further, in FIG. 7, reference numeral 373 denotes a convex portion and reference numeral 372a denotes a through-hole.

Figure 8:
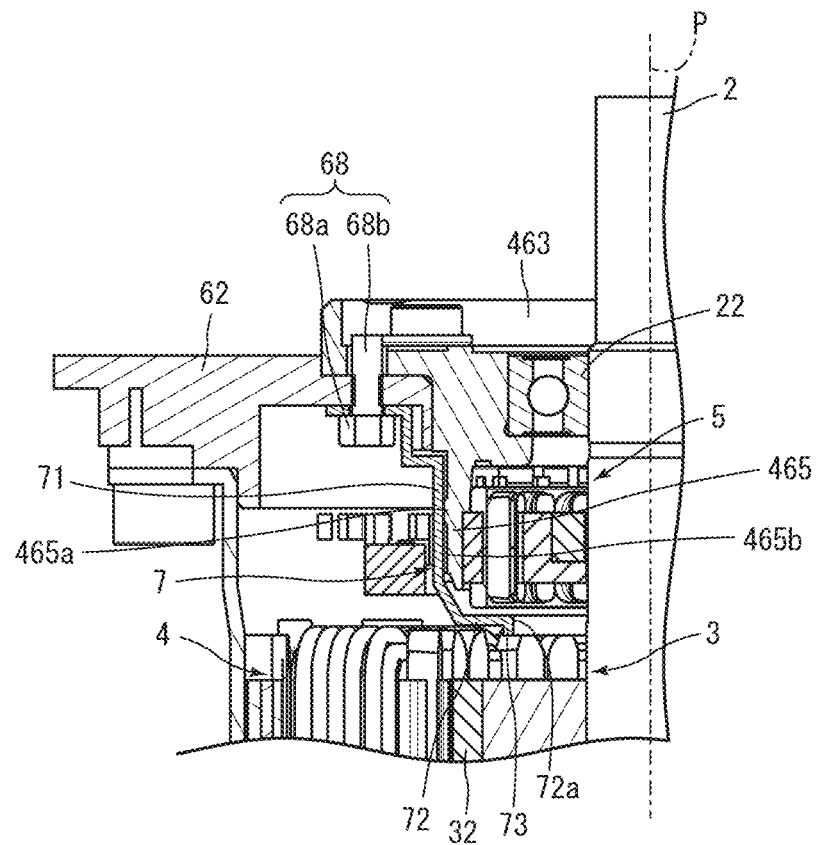
FIG. 8 is a view of a motor according to yet another example embodiment of the present disclosure corresponding to FIG. 3.

In each of the example embodiments, an inner circumferential surface of the cylindrical portion 71 of the shield member 7 is in contact with an outer circumferential surface of the holder extending portion 65 of the bearing holder 63. However, the cylindrical portion 71 of the shield member 7 and the holder extending portion 65 of the bearing holder 63 may face each other with a gap in the radial direction. Specifically, as shown in FIG. 8, a protrusion 465a protruding toward an outer side thereof in the radial direction may be formed on an outer circumferential surface of a holder extending portion 465 of a bearing holder 463. Accordingly, since the inner circumferential surface of the cylindrical portion 71 of the shield member 7 is in contact with the protrusion 465a, a gap 465b is formed between the inner circumferential surface of the cylindrical portion 71 and the outer circumferential surface of the holder extending portion 465.

With the above-described configuration, the magnetic flux may be further suppressed from flowing into a resolver stator 55 from the field magnet 32 of the rotor 3 through the shield member 7 and the holder extending portion 465. That is, as in the above-described configuration, by forming the gap 465b between the cylindrical portion 71 of the shield member 7 and the holder extending portion 465 of the bearing holder 463 in the radial direction, the flow of the magnetic flux in the radial direction in the gap 465b is suppressed. Accordingly, the magnetic flux may be further suppressed from flowing into the resolver stator 55 from the field magnet 32 of the rotor 3.

Further, in the above-described configuration, the shield member 7 may be fixed to the bearing holder 463 by press-fitting the cylindrical portion 71 of the shield member 7 to the holder extending portion 465. Therefore, the fixation by the fixing bolt 68 as in each of the example embodiments is not required.

Further, the present disclosure is not limited to the above-described configuration. In any configuration, as long as a gap is formed between a shield member and a holder extending portion of a bearing holder, a protrusion may be formed on the inner circumferential surface of the shield member, and a concave portion may be formed on at least one side of the inner circumferential surface of the shield member and the outer circumferential surface of the holder extending portion. Further, a gap may be formed between the shield member and the bearing holder by arranging a separate member between the shield member and the holder extending portion of the bearing holder.

In each of the example embodiments, a long hole 66a for bolt adjusting and a long hole 66b for bolt fixing are formed in the bearing holder 63. Accordingly, a position of the bearing holder 63 may be adjusted about the central axis P in the circumferential direction with respect to the flange 62. That is, the resolver stator 55 fixed to the bearing holder 63 may be adjusted in the circumferential direction with respect to the resolver rotor 51. As described above, the configuration in which the positions of the flange 62 and the bearing holder 63 are adjusted is not limited to the above-described configuration having the long holes and may be another configuration. For example, any configuration as long as the positions of the flange 62 and the bearing holder 63 can be adjusted in the circumferential direction, such as formation of a plurality of bolt holes in the bearing holder and change of a fastening position of a bolt, may be provided.

In each of the example embodiments, the field magnet 32 of the rotor 3 is disposed on an outer circumferential surface of a rotor core 31. However, the field magnet 32 may be disposed on an inner side of the rotor core 31. Further, a shape of the field magnet 32 is not limited to a semi-cylindrical shape, but the field magnet 32 may have a rectangular parallelepiped shape or a polygonal columnar shape. Further, the field magnet 32 may have a substantially semi-cylindrical shape in the configuration in which the field magnet 32 is disposed on the outer circumferential surface of the rotor core 31. However, as described above, in the configuration in which the field magnet 32 is disposed on the inner side of the rotor core 31, the field magnet 32 may have a rectangular parallelepiped shape or a polygonal columnar shape.

In each of the example embodiments, the motors 1 and 101 are inner rotor-type motors in which a cylindrical rotor 2 is rotatably arranged in a cylindrical stator 3. However, the motors may be outer rotor-type motors in which a cylindrical column stator is disposed in a cylindrical rotor.

The present disclosure is applicable to a motor having a magnetic sensor.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a shaft that extends in an axial direction;
   a rotor that is rotatable together with the shaft and includes a field magnet;
   a stator opposing the rotor in a radial direction;
   a magnetic sensor positioned farther toward one side of the motor in the axial direction than the rotor and the stator;
   a shield including at least a portion positioned between the rotor and the magnetic sensor in the axial direction;
   a cylindrical housing in which at least the rotor and the stator are accommodated and which includes a bottom with a bottom opening;
   a plate-shaped flange fixed to the housing and including an insertion hole into which the shaft is inserted and passes through;
   a bearing that rotatably supports the shaft; and
   a bearing holder of which at least a portion is positioned in the insertion hole of the flange and which includes a hole portion in which the bearing is accommodated; wherein
   the rotor is positioned on an inner side of the stator in the radial direction;
   the magnetic sensor is a rotation angle sensor;
   the rotation angle sensor includes a sensor rotor and a sensor stator;
   the sensor rotor is positioned on an inner side of the sensor stator in the radial direction;
   the rotor and the sensor rotor are fixed to an outer side of the shaft in the radial direction to be rotatable together with the shaft;
   the sensor stator is fixed to the bearing holder;
   the bearing holder is fixed to the flange to be positionally adjustable in a circumferential direction about an axis line of the shaft;
   the shield includes:
     a bottom portion of which at least a portion is positioned between the rotor and the magnetic sensor in the axial direction and including a through-hole through which the shaft passes;
     a convex portion that extends from the bottom portion toward another side of the motor in the axial direction;
     a cylindrical portion that extends from the bottom portion toward the one side of the motor in the axial direction and covers a portion of the bearing holder; and
     a fixing portion provided in the cylindrical portion, the fixing portion being fixed to the flange;
   a front end portion of the convex portion is positioned farther toward an inner side of the motor in the radial direction than an outer circumferential portion of the field magnet when viewed in the axial direction; and
   the fixing portion is fixed to the flange from an inner side of the housing by a fixing bolt.

2. The motor of claim 1, wherein the front end portion of the convex portion is positioned farther toward the inner side of the motor in the radial direction than an inner circumferential portion of the field magnet when viewed in the axial direction.

3. The motor of claim 1, wherein the convex portion is positioned on a portion of a peripheral edge portion facing the through-hole in the bottom portion of the shield and extends toward another side of the motor in the axial direction.

4. The motor of claim 3, wherein the convex portion has a shape which surrounds the through-hole in a cross section orthogonal to the axial direction.

5. The motor of claim 1, wherein
   a hole diameter of the through-hole of the shield is greater than an outer diameter of the sensor rotor.

6. The motor of claim 1, wherein the bearing holder includes:
   a bearing support portion including the hole portion and of which a portion is positioned in the insertion hole of the flange;
   a cylindrical holder extending portion that extends from the bearing support portion to the other side in the axial direction; and
   a protrusion that protrudes from the bearing support portion toward the outside in the radial direction and positioned on one side in the axial direction with respect to the flange; wherein
   the sensor stator is fixed on an inner circumferential surface of the holder extending portion; and
   the protrusion is fixed to the flange to be positionally adjustable in the circumferential direction about the axis line of the shaft.

7. The motor of claim 1, wherein the cylindrical portion of the shield and the holder extending portion of the bearing holder face each other with a gap in the radial direction.

8. The motor of claim 1, wherein
   the flange includes a flange protrusion that extends toward the another side in the axial direction on an edge portion facing the insertion hole; and,
   the fixing portion includes a first protrusion that protrudes from an end portion on one side in the axial direction in the cylindrical portion toward an outer side in the radial direction;
   a second protrusion that protrudes from an outer end of the first protrusion in the radial direction toward one side in the axial direction; and
   an attachment portion positioned on the end portion on one side of the second protrusion in the axial direction and fixed to the flange;
   the second protrusion is positioned farther toward the outer side in the radial direction than the flange protrusion.

* * * * *